(12) United States Patent
Ho et al.

(10) Patent No.: US 9,057,806 B2
(45) Date of Patent: Jun. 16, 2015

(54) LIGHT SOURCE AND BACKLIGHT MODULE HAVING THE SAME

(75) Inventors: Chen-Hung Ho, Taoyuan County (TW); Wei-Tien Chang, Taichung (TW); Shau-Yu Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 965 days.

(21) Appl. No.: 13/209,445

(22) Filed: Aug. 15, 2011

(65) Prior Publication Data

US 2012/0113620 A1    May 10, 2012

Related U.S. Application Data

(63) Continuation-in-part of application No. 13/005,545, filed on Jan. 13, 2011.

(30) Foreign Application Priority Data

Nov. 4, 2010  (TW) ............... 99137995 A
Jun. 22, 2011 (TW) ............... 100121814 A

(51) Int. Cl.
  *F21V 8/00* (2006.01)
(52) U.S. Cl.
  CPC ............ *G02B 6/0021* (2013.01); *G02B 6/0031* (2013.01); *G02B 6/0068* (2013.01); *G02B 6/009* (2013.01)
(58) Field of Classification Search
  CPC .... G02B 6/001; G02B 6/0021; G02B 6/0031; G02B 6/0009; G02B 6/0018; G02B 6/0068

USPC ............. 362/296.01, 297–300, 609, 612
See application file for complete search history.

(56) References Cited

U.S. PATENT DOCUMENTS 8,240,865 B2 *  8/2012  Park ........................ 362/97.3
2003/0201451 A1  10/2003  Suehiro et al.
(Continued)

FOREIGN PATENT DOCUMENTS

CN    1525219    9/2004
TW    200914900  4/2009
(Continued)

OTHER PUBLICATIONS

"Second Office Action of China Counterpart Application", issued on Apr. 28, 2013, p. 1-6.

*Primary Examiner* — Mary McManmon
(74) *Attorney, Agent, or Firm* — Jianq Chyun IP Office

(57) ABSTRACT

A light source includes a carrier, a plurality of solid-state light-emitting devices, a light-incoupling component, a first reflector, and a plurality of second reflectors. The solid-state light-emitting devices and the light-incoupling component are configured on the carrier. The light-incoupling component has a bottom surface, a top surface, a plurality of side surfaces adjoining the bottom surface and the top surface, and a through hole extending from the bottom surface to the top surface. The solid-state light-emitting devices are located in the through hole. The first reflector covers the through hole. The second reflectors are configured on the side surfaces. Light emitted from the solid-state light-emitting devices enters the light-incoupling component via a sidewall of the through hole and leaves the light-incoupling component via the top surface thereof.

10 Claims, 11 Drawing Sheets

(56) References Cited

U.S. PATENT DOCUMENTS

2007/0086211 A1  4/2007  Beeson et al.
2008/0170392 A1* 7/2008  Speier et al. ................ 362/227

FOREIGN PATENT DOCUMENTS

TW      200916845   4/2009
TW      I329768     9/2010

* cited by examiner

LIGHT SOURCE AND BACKLIGHT MODULE HAVING THE SAME

CROSS-REFERENCE TO RELATED APPLICATION

This application is a continuation-in-part application of and claims the priority benefit of U.S. application Ser. No. 13/005,545, filed on Jan. 13, 2011, now pending, which claims the priority benefit of Taiwan application serial no. 99137995, filed on Nov. 4, 2010. This application also claims the priority benefit of Taiwan application serial no. 100121814, filed on Jun. 22, 2011. The entirety of each of the above-mentioned patent applications is hereby incorporated by reference herein and made a part of this specification.

BACKGROUND OF THE INVENTION

1. Field of the Invention

The invention relates to a backlight module, and more particularly to a design of a light source in a backlight module.

2. Description of Related Art

In recent years, liquid crystal displays (LCDs) that have been developed to achieve full-color display gradually replace conventional cathode ray tube (CRT) displays and have become mainstream displays in the market due to the advantages of low operation voltages, non-radiation, light weight, small volume occupancy, and so forth. The LCDs are non-self-illuminating displays, and therefore display functions of the LCDs are achieved when the required light is provided by backlight modules. With increasing consciousness of environmental protection, cold cathode fluorescent lamps (CCFLs) serving as light-emitting devices in conventional backlight modules are gradually replaced by light-emitting diode (LED) devices because the LED devices that are more friendly to the environment.

FIG. 1 is a schematic cross-sectional view illustrating a conventional backlight module. With reference to FIG. 1, a conventional backlight module 100 includes a light guide plate (LGP) 110, a plurality of light sources 120, and a plurality of optical clear adhesives 130. The LGP 110 has a light-incident surface 110a and a light-emitting surface 110b opposite to the light-incident surface 110a. Each of the light sources 120 is adhered to the light-incident surface 110a of the LGP 110 via one of the corresponding optical clear adhesives 130, respectively.

As shown in FIG. 1, each of the light sources 120 includes a carrier 120a, a plurality of LED devices 120b, a light-incoupling component 120c, and a plurality of ring-shaped reflectors 120d. The LED devices 120b and the light-incoupling component 120c are configured on the carrier 120a. Light emitted from the LED devices 120b enters the light-incoupling component 120c from the side surface S of the light-incoupling component 120c and leaves the light-incoupling component 120c from a top surface T of the light-incoupling component 120c. The ring-shaped reflectors 120d cover the LED devices 120b and an edge of the top surface T. Besides, the top surface T of the light-incoupling component 120c is adhered to the light-incident surface 110a of the LGP 110 via the optical clear adhesive 130.

As indicated in the region X of FIG. 1, the light emitted from the light source 120 in FIG. 1 is excessively concentrated on top of the light-incoupling component 120c. In addition, a part of the light emitted from each of the LED devices 120b passes through the corresponding optical clear adhesive 120 and is then reflected by the sidewall of each of the ring-shaped reflectors 120d, which causes light leakage as indicated in the region Y of FIG. 1. Accordingly, the conventional backlight module 100 has unfavorable optical uniformity, and said problem requires an effective solution.

SUMMARY OF THE INVENTION

The invention is directed to a light source and a backlight module that have favorable optical characteristics.

The invention provides a light source that includes a carrier, a plurality of solid-state light-emitting devices, a light-incoupling component, a first reflector, and a plurality of second reflectors. The solid-state light-emitting devices and the light-incoupling component are configured on the carrier. The light-incoupling component includes a bottom surface, a top surface, a plurality of side surfaces adjoining the bottom surface and the top surface, and a through hole extending from the bottom surface to the top surface. The solid-state light-emitting devices are located in the through hole. The first reflector covers the through hole. The second reflectors are configured on the side surfaces. Light emitted from the solid-state light-emitting devices enters the light-incoupling component via a sidewall of the through hole and leaves the light-incoupling component via the top surface thereof.

According to an embodiment of the invention, the carrier is a circuit board, for instance.

According to an embodiment of the invention, the solid-state light-emitting devices are side-view LED packages, for instance.

According to an embodiment of the invention, each of the solid-state light-emitting devices has a light-emitting surface, and each of the light-emitting surfaces faces the sidewall of the through hole.

According to an embodiment of the invention, a shape of the first reflector and a shape of the through hole are substantially the same.

According to an embodiment of the invention, the through hole includes a circular through hole, an elliptical through hole, or a polygonal through hole.

According to an embodiment of the invention, the sidewall of the through hole includes a plurality of curved surfaces.

According to an embodiment of the invention, the first reflector is a reflective plate, and the first reflector and the top surface of the light-incoupling component are substantially located on the same plane.

According to an embodiment of the invention, a gap is between the first reflector and the solid-state light-emitting devices.

According to an embodiment of the invention, the second reflectors include a plurality of reflective plates or a plurality of reflective coatings.

According to an embodiment of the invention, the light source can further include an optical filler that fills the through hole and encapsulates the solid-state light-emitting devices. A refractive index of the optical filler is different from a refractive index of the light-incoupling component.

According to an embodiment of the invention, the light source can further include a third reflective layer configured between the carrier and the bottom surface of the light-incoupling component. For instance, the third reflective layer is a white sheet.

The invention further provides a backlight module that includes at least one light source as described above, an LGP, and at least one optical clear adhesive. The LGP has a light-incident surface and a light-emitting surface opposite to the light-incident surface. The first reflector of the light source and the top surface of the light-incoupling component are adhered to the light-incident surface of the LGP via the optical clear adhesive.

According to an embodiment of the invention, a top surface of the LGP has a plurality of optical micro-structures, and the optical micro-structures are printed dots, V-cuts, or other optical micro-structures suitable for scattering light, for instance.

The invention further provides a planar light source that includes a first reflector, a plurality of light bars, an LGP, and a plurality of second reflectors. The light bars are configured on the first reflector. The LGP is configured on the first reflector to cover the light bars. Besides, the LGP has a first surface, a second surface opposite to the first surface, and a plurality of convex couplers separated from one another and located on the second surface. Each of the convex couplers has a bar structure. Each of the light bars is located between two adjacent convex couplers. Light emitted from each of the light bars enters the LGP via at least one sidewall of at least one of the convex couplers and leaves the LGP via the first surface. The second reflectors are configured on the second surface on which none of the convex couplers is located.

According to an embodiment of the invention, each of the light bars includes a carrier and a plurality of solid-state light-emitting devices. The solid-state light-emitting devices are configured on the carrier. Light emitted from the solid-state light-emitting devices enters the LGP via the sidewall of at least one of the convex couplers and leaves the LGP via the first surface.

According to an embodiment of the invention, the carrier includes a circuit board.

According to an embodiment of the invention, the solid-state light-emitting devices include side-view LED packages.

According to an embodiment of the invention, the solid-state light-emitting devices in each of the light bars are arranged in two rows. Light emitted from the solid-state light-emitting devices that are arranged in the two rows respectively enters the LGP via sidewalls of two adjacent convex couplers.

According to an embodiment of the invention, the solid-state light-emitting devices in each of the light bars are arranged in one row. Light emitted from the solid-state light-emitting devices that are arranged in the one row enters the LGP via one sidewall of a corresponding convex coupler of the convex couplers, and the other sidewall of the corresponding convex coupler is covered by one of the second reflectors.

According to an embodiment of the invention, an inclined angle of the sidewall of each of the convex couplers is θ. For instance, θ substantially ranges from 0 degree to 68 degrees.

According to an embodiment of the invention, the sidewall of each of the convex couplers has an optical micro-structure.

According to an embodiment of the invention, the second reflectors include a plurality of reflective plates or a plurality of reflective coatings.

According to an embodiment of the invention, the planar light source further includes a plurality of light leakage restraining layers. Each of the light leakage restraining layers is respectively configured between one of the convex couplers and the first reflector.

The solid-state light-emitting devices are configured in the through hole of the light-incoupling component, and the first reflector that covers the through hole and the second reflectors configured on the side surfaces of the light-incoupling component allow the light to be emitted uniformly from the top surface of the light-incoupling component according to the embodiments of the invention. Hence, the light source and the backlight module mentioned above have favorable optical characteristics. Besides, in the planar light source described in another embodiment of the invention, the LGP has a plurality of convex couplers separated from one another, such that light can be emitted uniformly from the first surface of the LGP. Therefore, the planar light source mentioned above has favorable optical characteristics.

To make the above and other features and advantages of the invention more comprehensible, several embodiments accompanied with figures are detailed as follows.

BRIEF DESCRIPTION OF THE DRAWINGS

The accompanying drawings are included to provide further understanding, and are incorporated in and constitute a part of this disclosure. The drawings illustrate exemplary embodiments and, together with the description, serve to explain the principles of the disclosure.

DESCRIPTION OF EMBODIMENTS

First Embodiment

Figure 1:
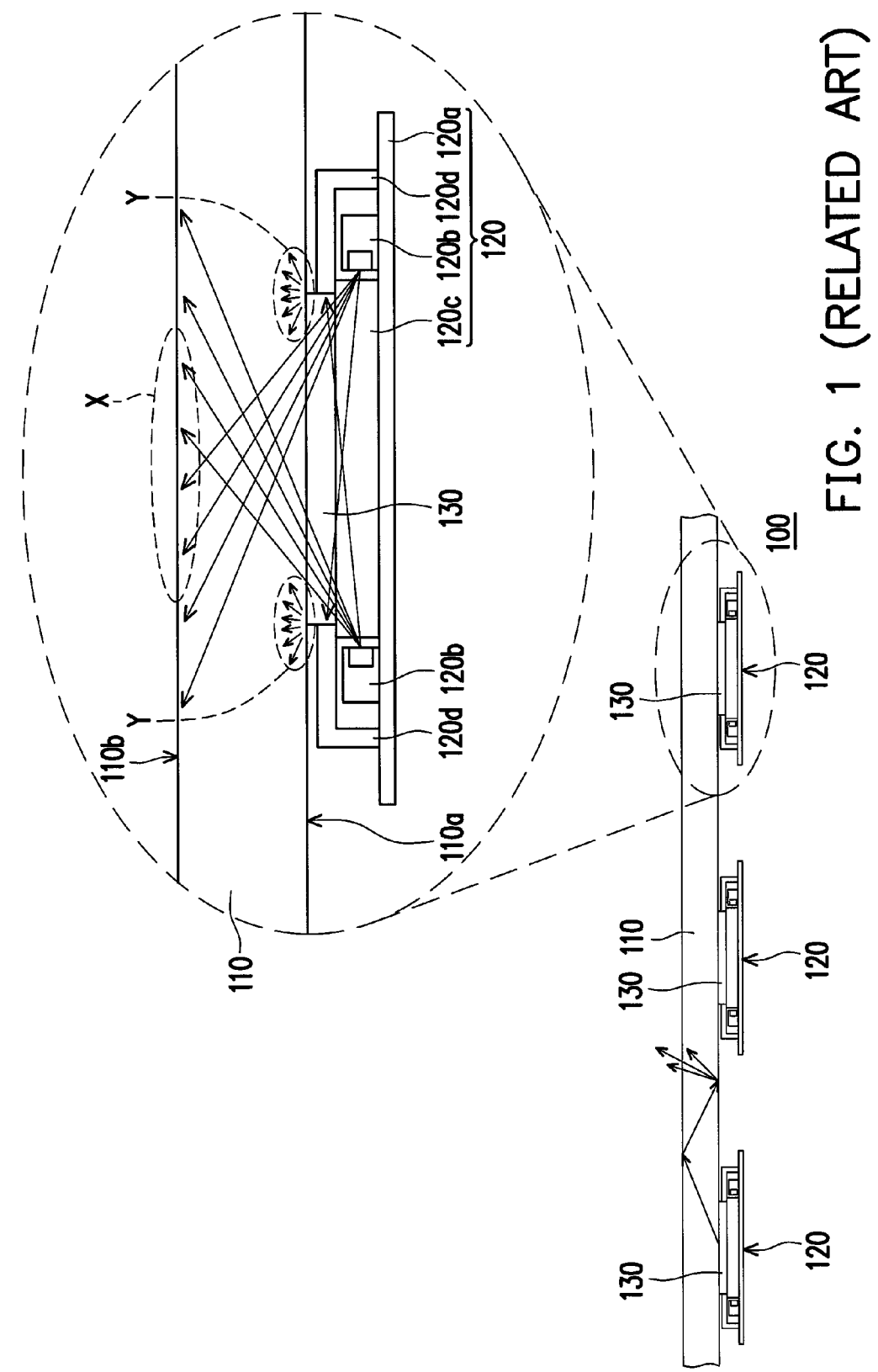
FIG. 1 is a schematic cross-sectional view illustrating a conventional backlight module.
Figure 2A:
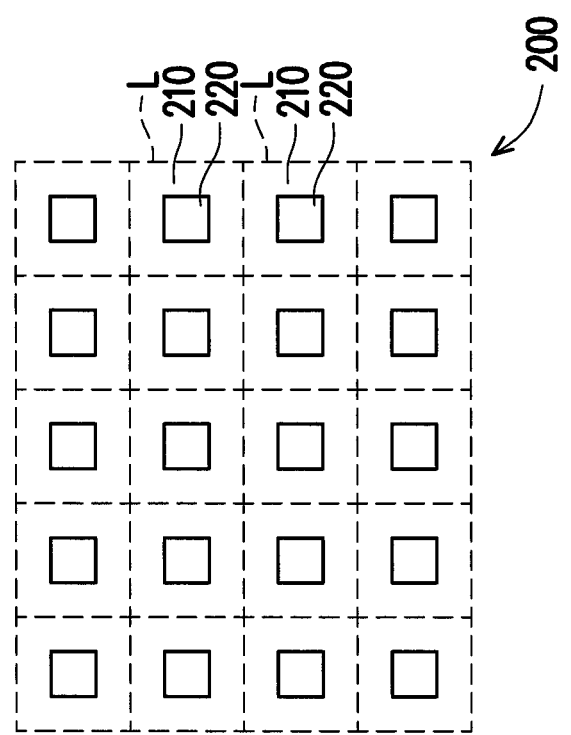
FIG. 2A is a schematic bottom view illustrating a backlight module according to a first embodiment of the invention.
Figure 2B:
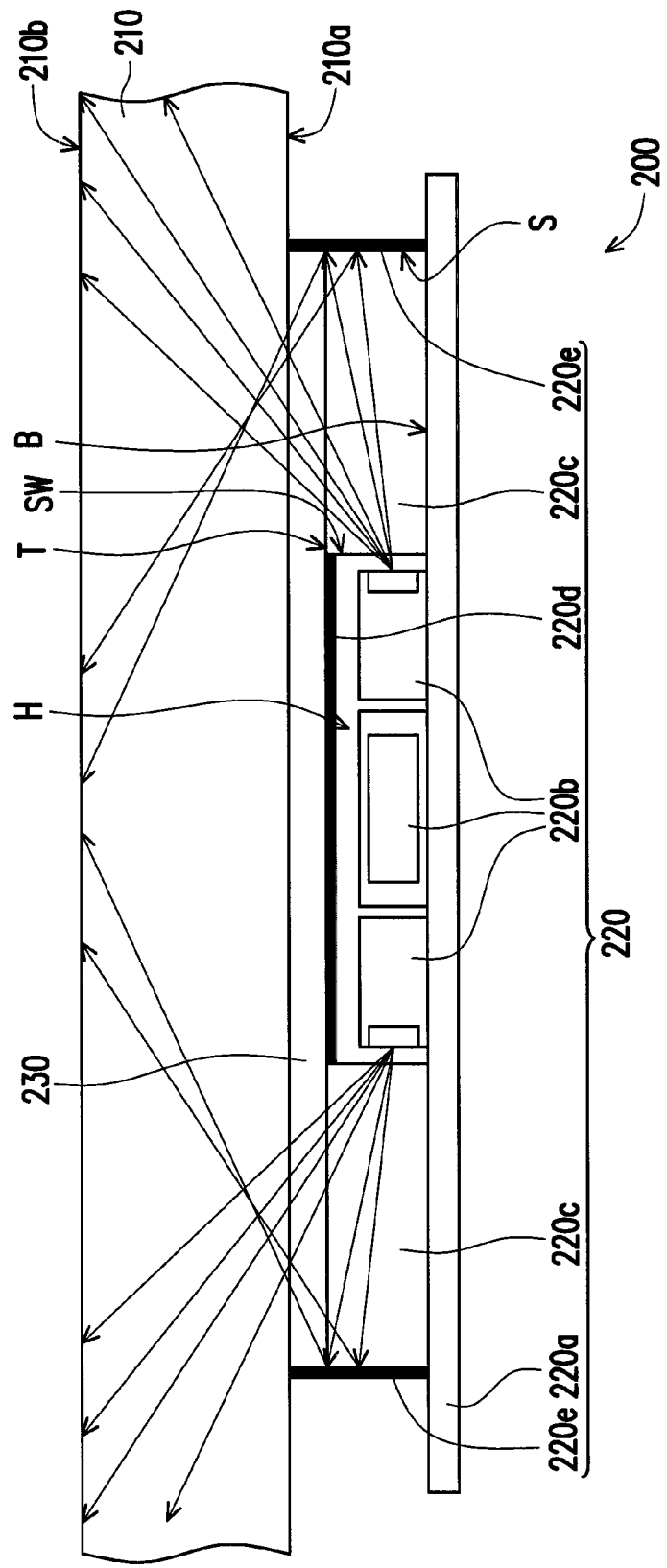
FIG. 2B is a schematic cross-sectional view illustrating a backlight module according to the first embodiment of the invention.
Figure 2C:
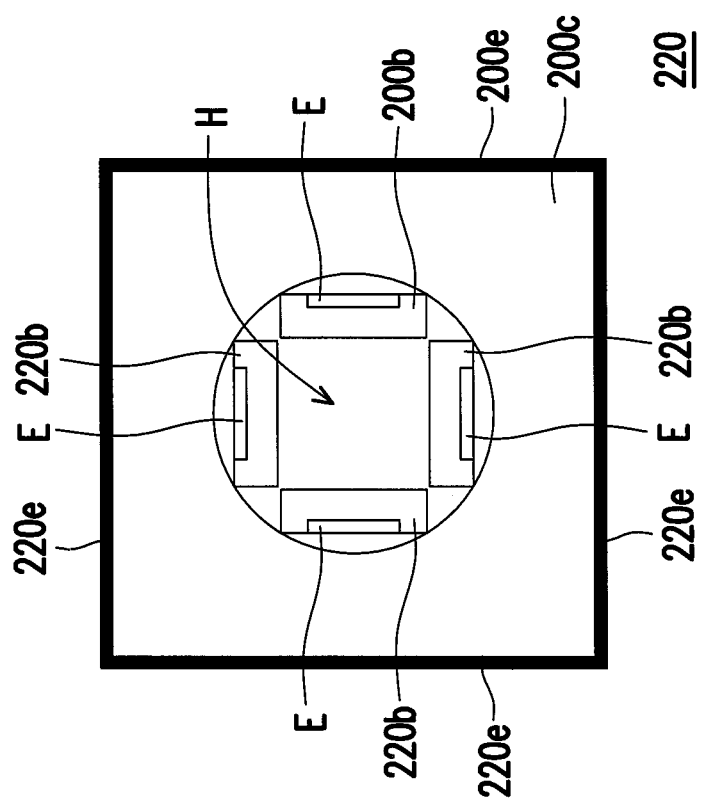
FIG. 2C is a schematic top view illustrating a light source according to the first embodiment of the invention.

FIG. 2A is a schematic bottom view illustrating a backlight module according to a first embodiment of the invention. FIG. 2B is a schematic cross-sectional view illustrating a backlight module according to the first embodiment of the invention. FIG. 2C is a schematic top view illustrating a light source according to the first embodiment of the invention. With reference to FIG. 2A to FIG. 2C, the backlight module 200 of this embodiment includes an LGP 210, one or more light sources 220, and one or more optical clear adhesives 230. The LGP 210 has a light-incident surface 210a and a light-emitting surface 210b opposite to the light-incident surface 210a. Each of the light sources 220 is adhered to the light-incident surface 210a of the LGP 210 via one of the optical clear adhesives 230, respectively. In this embodiment, the number of the light sources 220 in the backlight module 200 can be properly adjusted based on actual product requirements. For instance, when the backlight module 200 is applied to a small-scale LCD panel, the backlight module 200 can have a single light source 220. By contrast, when the backlight module 200 is applied to a medium-scale or a large-scale LCD panel, the backlight module 200 can have a plurality of light sources 220 arranged in arrays. As indicated in FIG. 2A, the light sources 220 are equidistantly arranged below the LGP 210, and each of the light sources 220 corresponds to one sub-illuminating region L on the LGP 210. In this embodiment, the distance between two adjacent light sources 220 is relevant to the optical design in the light sources 220. People having ordinary skill in the pertinent art are able to adjust the distance between the light sources 220 based on the optical design of the light sources 220, and the distance between the adjacent light sources 220 is not limited in this embodiment.

With reference to FIG. 2B and FIG. 2C, each of the light sources 220 of this embodiment includes a carrier 220a, a plurality of solid-state light-emitting devices 220b, a light-incoupling component 220c, a first reflector 220d, and a plurality of second reflectors 220e. The solid-state light-emitting devices 220b and the light-incoupling component 220c are configured on the carrier 220a. The light-incoupling component 220c has a bottom surface B, a top surface T, a plurality of side surfaces S adjoining the bottom surface B and the top surface T, and a through hole H extending from the bottom surface B to the top surface T. The solid-state light-emitting devices 220b are located in the through hole H. The first reflector 220d covers the through hole H. The second reflectors 220e are configured on the side surfaces S of the light-incoupling component 220c. Light emitted from the solid-state light-emitting devices 220b enters the light-incoupling component 220c via a sidewall SW of the through hole H and leaves the light-incoupling component 220c via the top surface T. Besides, the first reflector 220d and the top surface T of the light-incoupling component 220c are adhered to the light-incident surface 210a of the LGP 210 via the corresponding optical clear adhesive 230.

The carrier 220a of this embodiment is a circuit board, for instance. The circuit board is, for example, the well-known FR-4 printed circuit board, FR-5 printed circuit board, metal core printed circuit board (MCPCB), and so on. Besides, the circuit board can also be a flexible printed circuit (FPC).

The solid-state light-emitting devices 220b are side-view LED packages, for instance. Additionally, the solid-state light-emitting devices 220b are mounted on the carrier 220a by surface mount technology (SMT), and the solid-state light-emitting devices 220b are electrically connected to the carrier 220a, for instance. Moreover, each of the solid-state light-emitting devices 220b of this embodiment has a light-emitting surface E, and each of the light-emitting surfaces E faces the sidewall SW of the through hole H.

Figure 3:
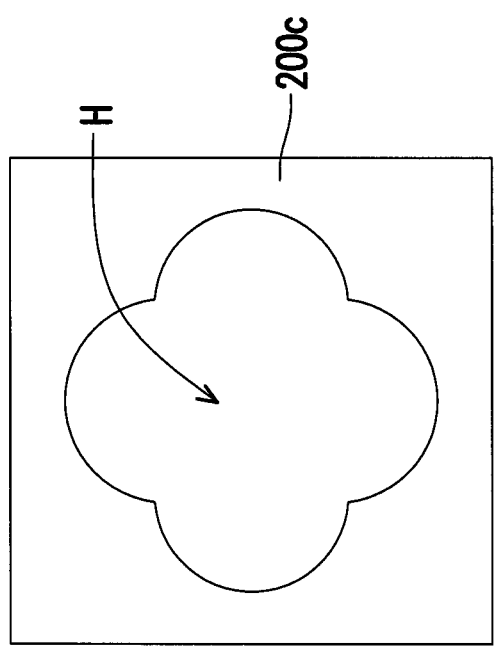
FIG. 3 is a schematic view illustrating a light-incoupling component according to the first embodiment of the invention.

In this embodiment, the light-incoupling component 220c is a square light-incoupling component that has a side length ranging from about 10 millimeters to about 20 millimeters, for example. The through hole H of the light-incoupling component 220c is a circular through hole (shown in FIG. 2C and having a diameter from about 5 millimeters to about 8 millimeters), an elliptical through hole (not shown), or a polygonal through hole (not shown), for example. According to other embodiments of the invention, the sidewall SW of the through hole H can include a plurality of curved surfaces and a plurality of crest lines which can be observed between the curved surfaces, as shown in FIG. 3. In this case, the design of the through hole H enhances uniformity of light distribution. The shape of the first reflector 220d can be adjusted in accordance with the shape of the through hole H in this embodiment. That is to say, the shape of the first reflector 220d and the shape of the through hole H are substantially the same. However, the shape of the first reflector 220d is however not limited in this embodiment.

Note that the first reflector 220d shields and/or reflects the light emitted from the solid-state light-emitting devices 220b, such that most of the light can enter the light-incoupling component 220c from the sidewall SW of the through hole H and leave the light-incoupling component 220c from the top surface T. The first reflector 220d can prevent parts of the light emitted from the solid-state light-emitting devices 220b from being directly transmitted in an upward manner and passing through the corresponding optical clear adhesives 230 and the LGP 210. Therefore, the first reflector 220d can resolve the issue of excessively concentrated light above the solid-state light-emitting devices 220b. In this embodiment, the first reflector 220d is a reflective plate, and the first reflector 220d and the top surface T of the light-incoupling component 220c are substantially on the same plane. However, the horizontal position of the first reflector 220d is not limited in this invention. Namely, the first reflector 220d can be slightly higher than or lower than the top surface T of the light-incoupling component 220c.

As clearly shown in FIG. 2B, a gap is between the first reflector 220d and the solid-state light-emitting devices 220b. In other words, the through hole H for accommodating the solid-state light-emitting devices 220b is not further filled with other materials. Since the medium (e.g., air) in the through hole and the light-incoupling component 220c have different refractive indexes, refraction occurs when the light emitted from the solid-state light-emitting devices 220b passes through the sidewall SW of the through hole H, which is conducive to light scattering. Note that the through hole H can be partially or fully filled with an optical filter to cover the solid-state light-emitting devices 220b in other embodiments of the invention, so as to further protect the solid-state light-emitting devices 220b. The optical filler and the light-incoupling component 220c should have different refraction indexes, such that the light is refracted when passing through the sidewall SW of the through hole H.

In this embodiment, the second reflectors 220e configured on the side surfaces S are a plurality of reflective plates or a plurality of reflective coatings, for instance. The second reflectors 220e reflect parts of the light entering the light-incoupling component 220c to the top of the first reflector 220d and the solid-state light-emitting devices 220b. To be more specific, the light entering the light-incoupling component 220c from the sidewall SW of the through hole H can be categorized into two types. The first type refers to the light directly passing through the top surface T of the light-incoupling component 220c, the optical clear adhesive(s) 230, and the LGP 210. The second type refers to the light passing through the top surface T of the light-incoupling component 220c, the optical clear adhesive(s) 230, and the LGP 210 after the light is reflected by the second reflectors 220e. If the proportion of the two types of light can be arranged appropriately, the uniform planar light source can be obtained according to this embodiment. For instance, people having ordinary skill in the art can selectively fabricate some optical micro-structures on the top surface 210b, the bottom surface 210a or both the top surface 210b and the bottom surface 120a of the LGP 210, so as to uniformize the light distribution on the top surface 20b of the LGP 210. The optical micro-structures are printed dots, V-cuts, or other optical micro-structures suitable for scattering light, for instance.

Figure 4:
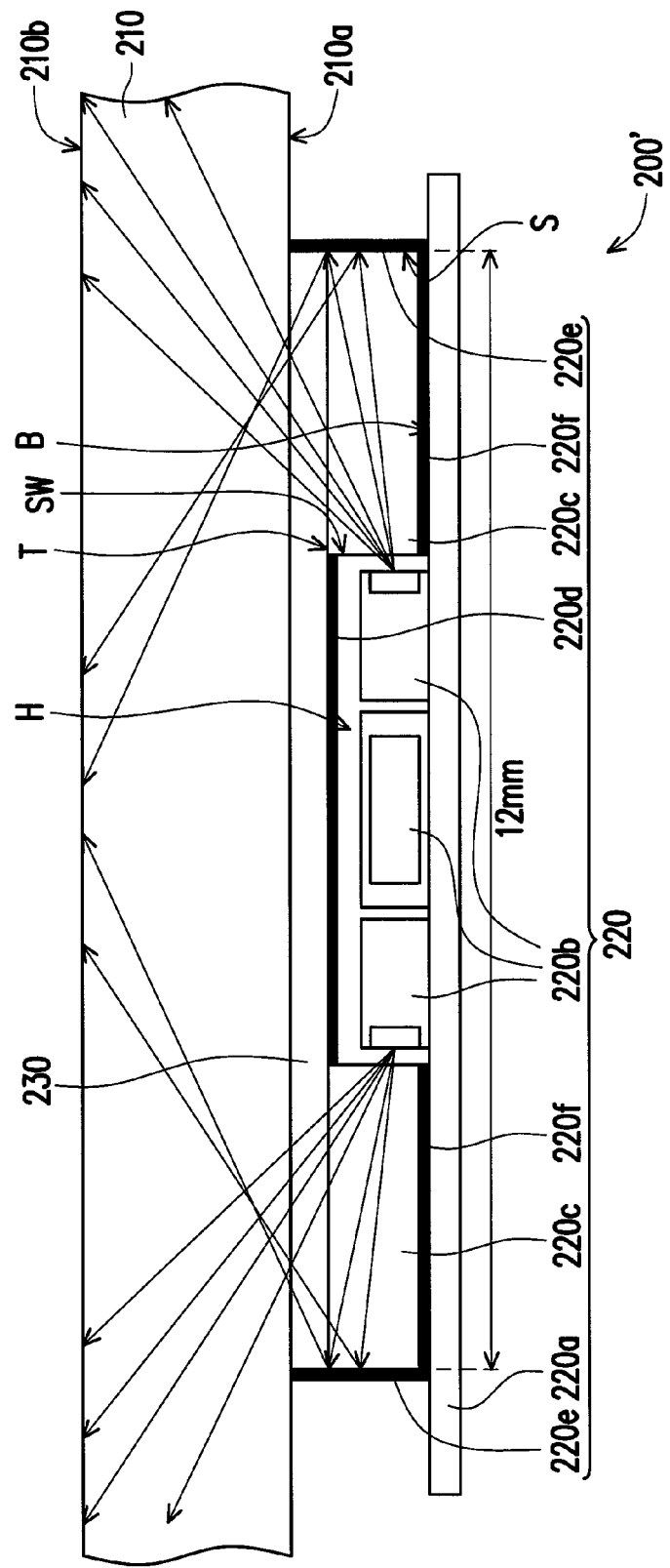
FIG. 4 is a schematic cross-sectional view illustrating a backlight module according to the first embodiment of the invention.

FIG. 4 is a schematic cross-sectional view illustrating a backlight module according to the first embodiment of the invention. With reference to FIG. 4, the backlight module 200' of this embodiment is similar to the backlight module 200 depicted in FIG. 2B, while the difference therebetween lies in that the light source 220' of the backlight module 200' in this embodiment further includes a third reflective layer 220f that is configured between the carrier 220a and the bottom surface B of the light-incoupling component 220c. The third reflective layer 220f is a white sheet or any other appropriate reflective plate, for example.

The solid-state light-emitting devices are configured in the through hole of the light-incoupling component, and the first reflector that covers the through hole and the second reflectors configured on the side surfaces of the light-incoupling component allow the light to be emitted uniformly from the top surface of the light-incoupling component according to the first embodiment. Hence, the light source and the backlight module mentioned above have favorable optical characteristics.

Experimental Example

Figure 5:
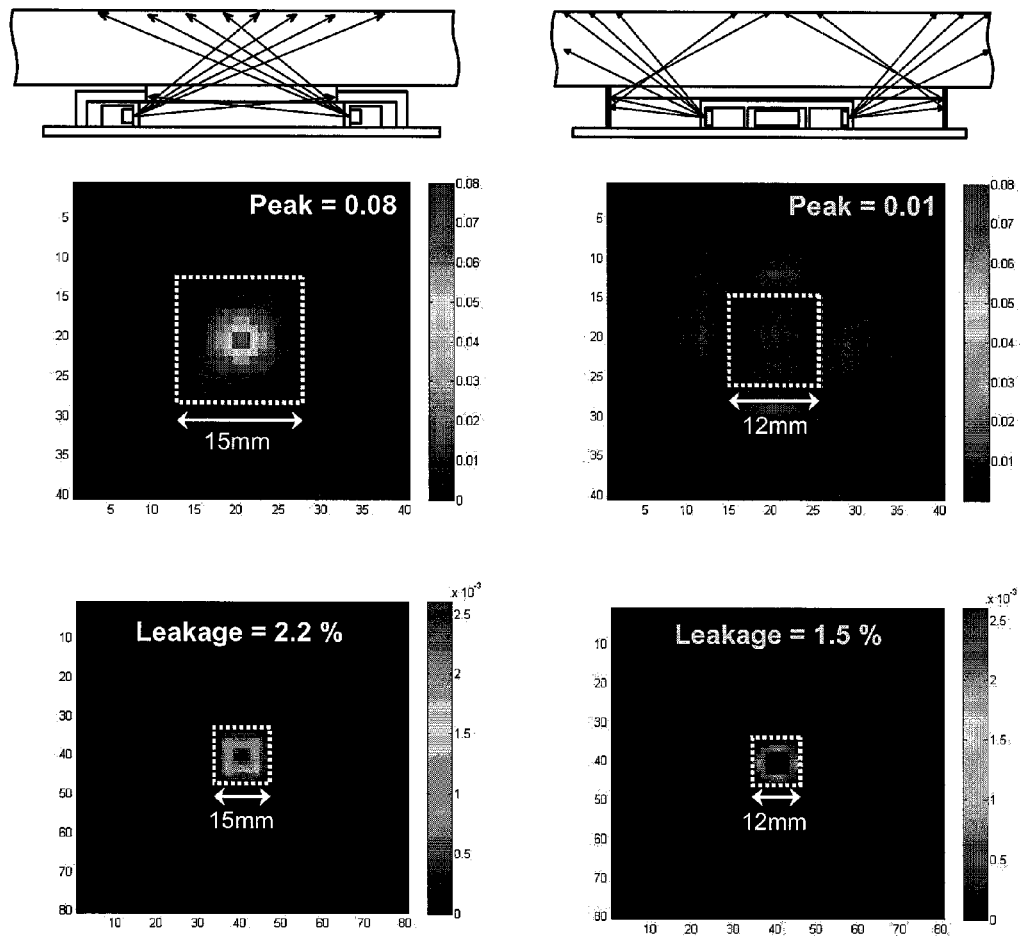
FIG. 5 shows comparison between optical characteristics according to the related art and according to the first embodiment of the invention, respectively.

FIG. 5 shows comparison between optical characteristics according to the related art and according to the first embodiment of the invention, respectively. With reference to the upper-left and the upper-right irradiance distribution views in FIG. 5, the light source in this invention is designed to achieve better uniformity of light distribution in comparison with the conventional light source. In addition, with reference to the lower-left and the lower-right light leakage energy distribution views in FIG. 5, the light leakage issue of the light source in this invention is rather insignificant in comparison with the issue occurring in the conventional light source.

Second Embodiment

Figure 6A:
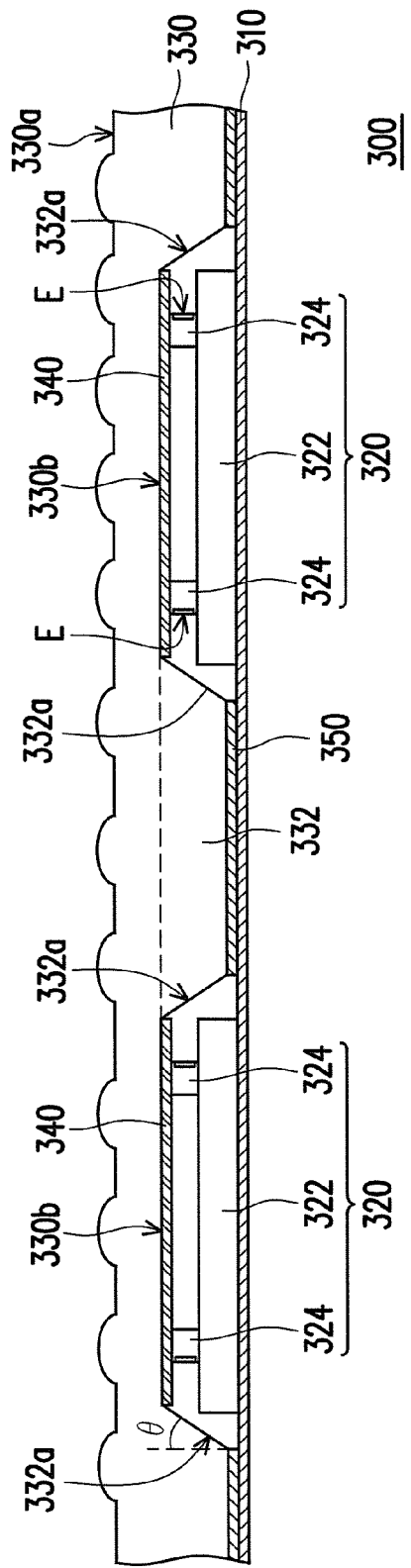
FIG. 6A is a schematic top view illustrating a planar light source according to a second embodiment of the application.
Figure 6B:
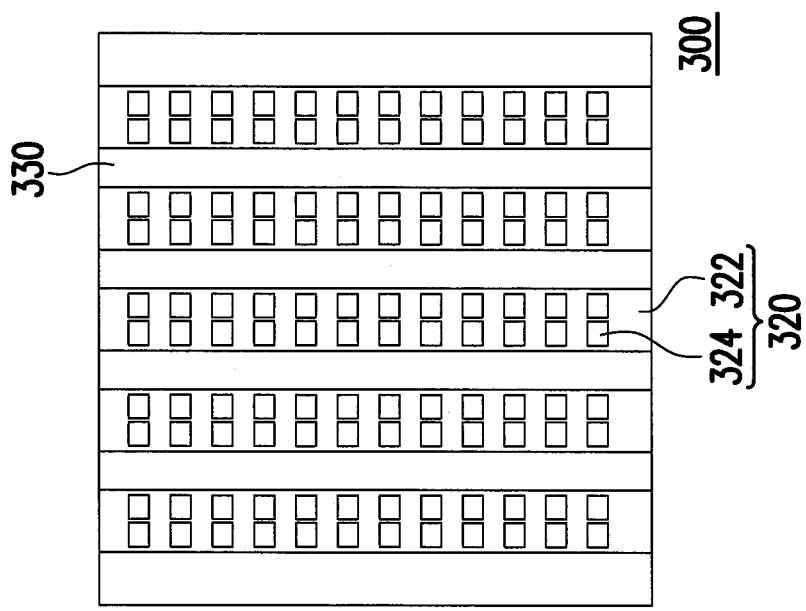
FIG. 6B is a schematic cross-sectional view illustrating the planar light source according to the second embodiment of the application.
Figure 7:
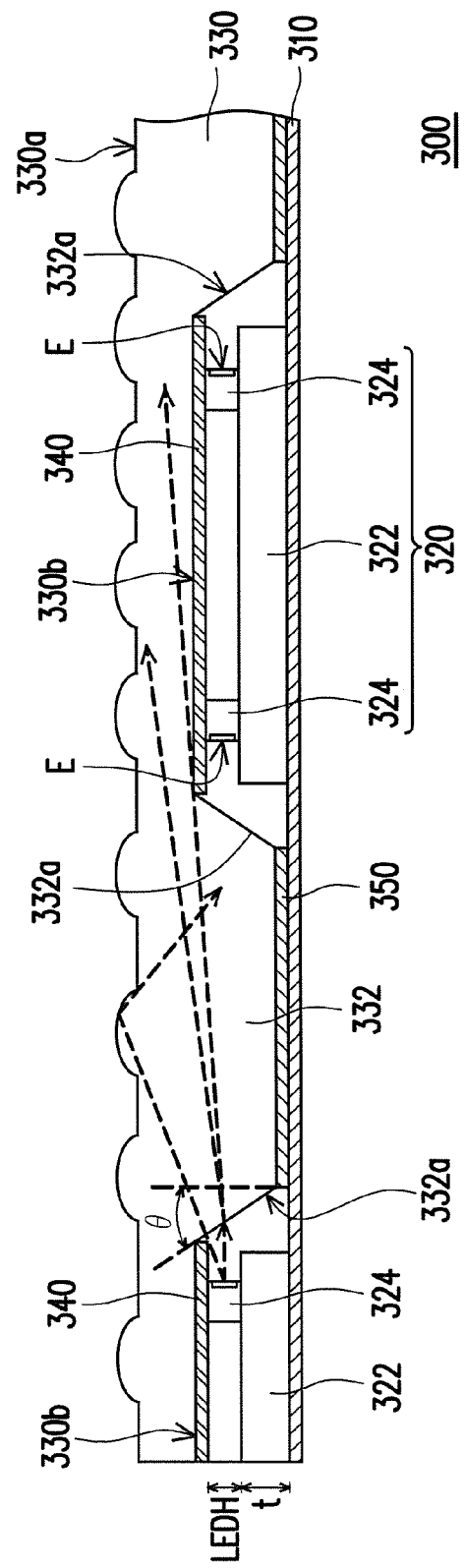
FIG. 7 is a schematic enlarged view illustrating a portion of an LGP according to the second embodiment of the invention.

FIG. 6A is a schematic top view illustrating a planar light source according to a second embodiment of the application. FIG. 6B is a schematic cross-sectional view illustrating the planar light source according to the second embodiment of the application. FIG. 7 is a schematic enlarged view illustrating a portion of an LGP according to the second embodiment of the invention. With reference to FIG. 6A and FIG. 6B, the planar light source 300 of this embodiment includes a first reflector 310, a plurality of light bars 320, an LGP 330, and a plurality of second reflectors 340. The light bars 320 are configured on the first reflector 310. The LGP 330 is configured on the first reflector 310 to cover the light bars 320. Besides, the LGP 330 has a first surface (a light-incident surface) 330a, a second surface 330b opposite to the first surface 330a, and a plurality of convex couplers 332 separated from one another and located on the second surface 330b. Each of the convex couplers 332 has a bar structure. Each of the light bars 320 is located between two adjacent convex couplers 332. Light emitted from each of the light bars 320 enters the LGP 330 via at least one sidewall 332a of at least one of the convex couplers 332 and leaves the LGP 330 via the first surface 330a. The second reflectors 340 are configured on the second surface 330b on which none of the convex couplers 332 is located. The second reflectors 340 are reflective plates or reflective coatings, for instance.

In this embodiment, the first reflector 310 is a reflective plate (e.g., a white sheet) or a substrate having the reflective coating.

As indicated in FIG. 6B, each of the light bars 320 includes a carrier 322 and a plurality of solid-state light-emitting devices 324. The solid-state light-emitting devices 324 are configured on the carrier 322. Light emitted from the solid-state light-emitting devices 324 enters the LGP 330 via the sidewall 332a of at least one of the convex couplers 332 and leaves the LGP 330 via the first surface 330a. Besides, the carrier 322 is a circuit board, for instance. The circuit board is, for example, the well-known FR-4 printed circuit board, FR-5 printed circuit board, MCPCB, and so on. Additionally, the circuit board can also be an FPC.

The solid-state light-emitting devices 324 are side-view LED packages, for instance. Besides, the solid-state light-emitting devices 324 are mounted on the carrier 322 by SMT, and the solid-state light-emitting devices 324 are electrically connected to the carrier 322, for instance. Each of the solid-state light-emitting devices 324 in this embodiment has a light-emitting surface E, and each of the light-emitting surfaces faces at least one sidewall 332a of at least one of the convex couplers 332.

Note that the extension direction of the convex couplers 332 is parallel to the extension direction of the light bars 320, for instance. The solid-state light-emitting devices 324 in each of the light bars 320 are arranged in two rows, for instance, and the row direction herein is parallel to the extension direction of the light bars 320. Light emitted from the solid-state light-emitting devices 324 arranged in the two rows in each of the light bars 320 enters the LGP 330 via sidewalls 332a of two adjacent convex couplers 332, respectively. Specifically, in each of the light bars 320, the solid-state light-emitting devices 324 arranged in one row (e.g., on the left side) have the light-emitting surfaces E facing the sidewall 332a of the convex coupler 332 at the left, and the solid-state light-emitting devices 324 arranged in the other row (e.g., on the right side) have the light-emitting surfaces E facing the sidewall 332a of the convex coupler 332 at the right.

As stated above, light entering the LGP 330 via the sidewalls 332a is partially reflected once or more than once, and thereby the transmission of the light is re-directed in the LGP 330. The light then leaves the LGP 330 via the first surface 330a (the light-emitting surface) 330a. According to this embodiment, light distribution in the LGP 330 can be adjusted by modifying the inclined angles θ of the sidewalls 332a. For instance, the inclined angle θ substantially ranges from 0 degree to 68 degrees. Note that the sidewall 332a of each of the convex couplers 332 can selectively have an optical micro-structure, and the optical micro-structure is a micro-prism or any other micro-structure that can reduce the possibility of total reflection. In addition, the first surface 330a has a plurality of protrusions that can scatter light, for instance, and the uniformity of the planar light source 300 can be adjusted by controlling both the dimensions of the protrusions and the distribution density, for instance.

As shown in FIG. 6A, the planar light source can selectively include a plurality of light leakage restraining layers 350. Each of the light leakage restraining layers 350 is respectively configured between one of the convex couplers 332 and the first reflector 310. In this embodiment, the light leakage restraining layers 350 are white sheets or other reflective materials that can reflect or absorb the leaked light, for instance.

FIG. 7 is a schematic enlarged view illustrating a portion of an LGP according to the second embodiment of the invention. With reference to FIG. 7, in order to optimize the inclined angles θ of the sidewalls 332a, the following conditions need to be satisfied:

$$2H_1+(H_1-LEDH/2-t)+P>Rh>(H_1-LEDH/2-t)+P;$$

$$Rh=Rd*\tan(\theta-\theta_2)+P;\text{ and}$$

$P=2n*(H_1+H_2)$. Here, n is a positive integer, $H_1$ is the thickness of the convex coupler 332, $H_2$ is the shortest distance between the first surface 330a and the second surface 330b, LEDH is the height of the solid-state light-emitting device 324, t is the thickness of the carrier 322, Rd is the horizontal distance from the light-emitting surface E of the solid-state light-emitting device 324 to the light-emitting surface E of the corresponding solid-state light-emitting device 324, Rh is the vertical distance from the light-emitting surface E of the solid-state light-emitting device 324 to the light-emitting surface E of the corresponding solid-state light-emitting device 324, $\theta_1$ is an angle of incidence, and $\theta_2$ is an angle of refraction.

Based on the above, with reference to the disclosure of the invention, people having ordinary skill in the art can properly adjust the numeral value of the inclined angle θ based on actual design demand.

Third Embodiment

Figure 8:
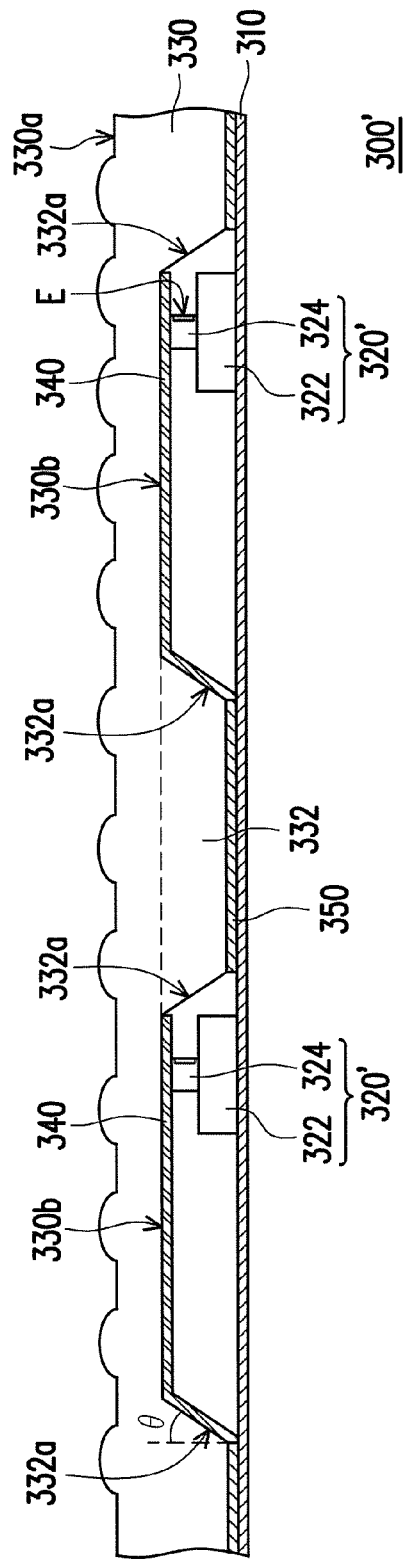
FIG. 8 is a schematic cross-sectional view illustrating a planar light source according to a third embodiment of the application.

FIG. 8 is a schematic cross-sectional view illustrating a planar light source according to a third embodiment of the application. As shown in FIG. 8, the planar light source 300' of this embodiment is similar to the planar light source 300 of the second embodiment, while the difference therebetween lies in that the solid-state light-emitting devices 324 in each of the light bars 320' are arranged in one single row. Light emitted from the solid-state light-emitting devices 324 in each of the light bars 320' enters the LGP 330 via one sidewall 332a of the corresponding convex coupler 332, and the other sidewall 332a of each convex coupler 332 is covered by one of the second reflectors 340'.

In the planar light source described in the second embodiment of the invention, the LGP has a plurality of convex couplers separated from one another, such that light can be emitted uniformly from the first surface of the LGP. Therefore, the planar light source described in the second embodiment of the invention has favorable optical characteristics.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A planar light source comprising:
a first reflector;
a plurality of light bars configured on the first reflector;
a light guide plate configured on the first reflector to cover the light bars, the light guide plate having a first surface, a second surface opposite to the first surface, and a plurality of convex couplers separated from one another and located on the second surface, each of the convex couplers having a bar structure, wherein each of the light bars is located between two adjacent convex couplers of the convex couplers, and light emitted from each of the light bars enters the light guide plate from at least one sidewall of at least one of the convex couplers and leaves the light guide plate via the first surface;
a plurality of second reflectors, wherein the second reflectors are configured on part of the second surface in which none of the convex couplers is located; and
a plurality of light leakage restraining layers located on a bottom surface of the convex coupler, wherein each of the light leakage restraining layers being respectively configured between one of the convex couplers and the first reflector such that each of the light restraining layers is in contact with the first reflector.

2. The planar light surface as claimed in claim 1, wherein each of the light bars comprises:
a carrier; and
a plurality of solid-state light-emitting devices configured on the carrier, light emitted from the solid-state light-emitting devices in each of the light bars entering the light guide plate through the at least one sidewall of the at least one of the convex couplers and leaving the light guide plate via the first surface.

3. The planar light source as claimed in claim 2, wherein the carrier comprises a circuit board.

4. The planar light source as claimed in claim 2, wherein the solid-state light-emitting devices comprise side-emitting light-emitting diode packages.

5. The planar light source as claimed in claim 2, wherein the solid-state light-emitting devices in each of the light bars are arranged in two rows, and light emitted from the solid-state light-emitting devices arranged in the two rows respectively enters the light guide plate via sidewalls of two adjacent convex couplers of the convex couplers.

6. The planar light source as claimed in claim 2, wherein the solid-state light-emitting devices in each of the light bars are arranged in one row, light emitted from the solid-state light-emitting devices arranged in the one row enters the light guide plate via one sidewall of a corresponding convex coupler of the convex couplers, and the other sidewall of the corresponding convex coupler is covered by one of the second reflectors.

7. The planar light source as claimed in claim 1, wherein an inclined angle of the at least one sidewall of each of the convex couplers is θ.

8. The planar light source as claimed in claim 7, wherein θ substantially ranges from 0 degree to 68 degrees.

9. The planar light source as claimed in claim 1, wherein the at least one sidewall of each of the convex couplers has an optical micro-structure.

10. The planar light source as claimed in claim 1, wherein the second reflectors comprise a plurality of reflective plates or a plurality of reflective coatings.

* * * * *